United States Patent [19]

Needes

[11] 4,169,025
[45] Sep. 25, 1979

[54] PROCESS FOR MAKING CATALYTICALLY ACTIVE RANEY NICKEL ELECTRODES

[75] Inventor: Christopher R. S. Needes, Newark, Del.

[73] Assignee: E. I. Du Pont de Nemours & Company, Wilmington, Del.

[21] Appl. No.: 905,971

[22] Filed: May 15, 1978

Related U.S. Application Data

[62] Division of Ser. No. 742,615, Nov. 17, 1976, Pat. No. 4,116,804.

[51] Int. Cl.² .......................... C25B 1/16; C25B 1/26; C25B 11/02; C25B 11/06
[52] U.S. Cl. ...................................... 204/98; 204/128; 204/290 R; 204/292
[58] Field of Search .............. 204/292, 98, 128, 290 R

[56] References Cited
U.S. PATENT DOCUMENTS

| | | |
|---|---|---|
| 3,407,231 | 10/1968 | Dickinson et al. ................... 428/566 |
| 3,846,344 | 11/1974 | Larson et al. ...................... 252/466 J |
| 4,086,149 | 4/1978 | Martinsons et al. .................... 204/98 |

Primary Examiner—R. L. Andrews
Attorney, Agent, or Firm—James A. Costello

[57] ABSTRACT

A process for making an electrode having a Raney nickel surface layer of thickness greater than 75 microns and an average porosity of at least 11%, comprising interdiffusing aluminum and nickel on a conductive metal core at a temperature of at least 660° C. to form a nickel-aluminum alloy layer on the core from which layer aluminum is selectively dissolved. When used as a cathode in an electrolytic cell for producing hydrogen, chlorine and caustic from brine, the electrode exhibits low hydrogen overvoltage.

14 Claims, 14 Drawing Figures

EXAMPLE I-2

FIG.1a

EXAMPLE I-1

FIG.1b
EXAMPLE I-2

FIG.4a
ALUMINUM-COATED NICKEL

- NiAl$_3$
- ALUMINUM
- Ni$_2$Al$_3$
- Ni BASE

FIG.4b
INTERDIFFUSED

FIG.4c
SELECTIVELY LEACHED

FIG.4d
WITH THIN COATING Ni

- NICKEL COATING
- POROUS Ni
- BASE Ni (MAGNIFICATION: EACH LARGE GRID IS 47 X 47 MICRONS)

FIG. 5a

EXAMPLE I-1

FIG. 5b

EXAMPLE I-2

(MAGNIFICATION: EACH LARGE GRID IS 24 X 24 MICRONS)

PROCESS FOR MAKING CATALYTICALLY ACTIVE RANEY NICKEL ELECTRODES

CROSS-REFERENCE TO RELATED APPLICATION

This application is a division of copending application bearing Ser. No. 742,615, filed on Nov. 17, 1976, now U.S. Pat. No. 4,116,804.

BACKGROUND OF THE INVENTION

This invention concerns a process for making a Raney nickel electrode and a process for using the electrode in a brine electrolysis cell.

It is known that an active, porous nickel can be produced by selectively dissolving a soluble component, such as aluminum or zinc, from an alloy of nickel and the soluble component. Such porous nickel and the alloy from which it is produced are frequently referred to, respectively, as "Raney nickel" and "Raney alloy", named after their inventor. Several specific methods for producing Raney nickel and a variety of uses for this material have been suggested in the past.

W. Vielstich, *Chemie-Ingenieur-Technik* 33, p. 75–79 (1961) describes a double-skeleton electrode of Raney nickel prepared by mixing powdered Raney alloy (e.g., nickel and an alloying component such as aluminum) with a skeleton material of pure metal powder (e.g., carbonyl nickel), pressing, sintering and then dissolving the alloying component from the Raney alloy. The surface layer of such an electrode comprises a dispersion of active Raney nickel particles embedded in a skeleton of inactive solid nickel particles. The electrode is suggested for use as, among other things, a hydrogen-evolution cathode in a chlorine-alkali electrolysis cell of the diaphragm type. However, double-skeleton electrodes, prepared by powder metallurgy techniques, have low mechanical strength and are generally unsuited for forming into large screen electrodes as are desired for commercial brine electrolysis processes.

A method for preparing Raney nickel sheet material by spraying molten particles of Raney alloy (e.g., nickel and aluminum alloy) on a metallic substrate and then selectively dissolving the aluminum is disclosed in Goldberger, U.S. Pat. No. 3,637,437. This material is suggested for use as catalytic cathodes for fuel cells. However, cathodes prepared by the disclosed technique generally have surfaces of low porosity and a tendency to spall.

Hahndorf et al., U.S. Pat. No. 3,272,728 and Hooker Chemicals & Plastics Corp. German Offenlegunsschrift 2,527,386 (based on F. Hine, U.S. Ser. No. 489,284) disclose electrodes having Raney nickel surfaces that are prepared by electrolytically codepositing nickel and zinc from an inorganic electrolytic bath onto a metal substrate to form a Raney alloy from which zinc is then selectively dissolved. The electrodes are reported to possess low hydrogen overvoltage characteristics. However, the disclosed techniques generally produce very thin layers of the Raney alloy and of the subsequently formed Raney nickel.

British Patent specification 1,289,751 (Siemens Aktiengesellschaft) discloses a method for making porous nickel electrodes for electrochemical cells or fuel cells by electrodepositing aluminum from an electrolyte containing an organo-aluminum complex compound upon a nickel or nickel alloy substrate, causing diffusion of some of the deposited aluminum into the nickel to form an alloy, from which aluminum is subsequently leached. The diffusion is carried out in an inert atmosphere at a temperature below 659° C., preferably between 350° and 650° C. for about 1 or 2 hours. Very thin electrodeposited layers of 5 to 20 micron thickness are disclosed.

J. Yasamura and T. Yoshino, "Laminated Raney Nickel Catalysts", *Ind. Eng. Chem. Prod. Res. Develop.* 11, No. 3, p. 290–293 (1972), though not related to electrodes, discloses the preparation of Raney nickel plates by spraying molten aluminum onto a nickel plate, heating in a nitrogen atmosphere for an hour at 700° C. to form a 0.2-mm-thick layer of $NiAl_3$ and then leaching aluminum from the layer. The resultant structure is reported to function effectively as a hydrogenation catalyst.

Another method of preparing shaped Raney nickel structures for use as hydrogenation catalysts is disclosed by Larson et al, U.S. Pat. No. 3,846,344. According to this patent, a nickel-coated metal tube is coated with an aluminum layer of at least 0.02-mm thickness; the aluminum is then diffused into the nickel by a heat treatment at a temperature of at least about 480° C. for at least 30 minutes; and aluminum is then selectively dissolved from the diffused layer. Example 5 of the patent discloses subjecting a 25-mm-diameter tube, having a 1-mm-thick electroplated nickel layer on which a 0.5-mm-thick layer of aluminum was flame sprayed, to a diffusion heat treatment at 650° C. for 6 hours to form an interdiffused layer of at least 0.05-mm thickness. The tube is then activated by immersion in a 25 percent solution of NaOH in water for 8 hours at 90° C. The surface is reported to be highly effective for the catalytic hydrogenation of cyclohexane.

Dickinson et al. U.S. Pat. No. 3,407,231 discloses a method of making a negative electrode having an active porous nickel surface, for use in alkaline batteries. The patent discloses forming the electrode by bringing aluminum into contact with the surface of a nickel-containing core at an elevated temperature, thereby interdiffusing the aluminum and nickel to form a layer of nickel aluminide ($Ni_2Al_3$), and then dissolving out the diffused aluminum with a caustic solution to produce a layer of active nickel metallurgically bonded to the core. Interdiffusion temperatures of 625° to 900° C. for 8 to 16 hours, dissolution temperatures of 20° to 100° C. for 1 to 32 hours, and coating thicknesses of 0.008 to 0.012 inch (200 to 300 microns) are mentioned. In particular, the process is described as being carried out by placing a nickel sheet in a pack consisting of a mixture of approximately 58% $Al_2O_3$, 40% Al powder and 2% $NH_4Cl$; heating the pack in a reducing atmosphere for 8 hours at 800° C. to form a layer of $Ni_2Al_3$ of 0.008-inch (200 microns) thickness on each face of the nickel plate; and then immersing the coated nickel core in a solution of 6 normal NaOH for about 16 hours at 80° C. to dissolve at least 85% of the aluminum out of the structure. However, we have found the Raney nickel surfaces of electrodes prepared by this particular process to be of low porosity. In lieu of the disclosed pack method for forming the $Ni_2Al_3$ layer, the patent suggests rolling the nickel sheet between two aluminum sheets to form a metallic bond and heating the layered structure in a reducing atmosphere at a temperature of 1100° F. (543° C.). Although temperatures below 1200° F. (649° C.) are preferred in this alternative method, temperatures as high as 1600° F. (872° C.) are suggested. However, we have found that roll bonding does not produce the desired metallic bond.

Although the art has suggested various methods for making porous nickel structures and has reported low hydrogen overvoltage characteristics for some of them, apparently none of these structures has been used as an electrode in a large-scale commercial cell for the electrolysis of brine into chlorine, hydrogen and caustic. Perhaps this resulted from the problems of spalling, mechanical weakness and insufficiently low hydrogen-overvoltage characteristics of the prior art structures as well as from technical and economic problems associated with their manufacture.

SUMMARY OF THE INVENTION

The present invention concerns a process for making an improved electrode for use as a hydrogen-evolution cathode in an electrolytic cell. The electrode has a continuous surface layer of active porous Raney nickel in electrical and metallurgical contact with a conductive metallic core of the electrode. The electrode provided by the process of this invention comprises a porous Raney nickel surface layer having a thickness of greater than 75 microns and an average porosity of at least 11% metallurgically bonded to the conductive core. Generally, the average size of the agglomerates in the surface layer is at least 35 microns. Preferred thicknesses of the porous nickel layer are between 100 and 400 microns, and most preferably between 150 and 300 microns. Preferred values for the porosity are between 15 and 25%, especially between 18 and 22%. Preferred average agglomerate sizes are between 40 and 400 microns, especially between 50 and 250 microns. The methods by which these parameters are measured are described hereinafter. Electrodes made according to the process of this invention have unusually low hydrogen overvoltage characteristics.

In the process of this invention an interdiffused nickel-aluminum alloy layer is formed on a conductive metal core and then aluminum is selectively leached from the interdiffused layer. The improvement comprises providing the core with a nickel-bearing outer surface layer having a thickness of at least 100 microns and containing at least 15 percent by weight nickel; interdiffusing aluminum and at least a portion of the nickel in the surface layer of the core at a temperature of at least 660° C. for a time sufficient to provide an interdiffused nickel-aluminum alloy layer with a thickness of at least 85 microns; and selectively leaching, with an aqueous base, sufficient aluminum from the interdiffused alloy layer to provide the active porous nickel layer with a thickness of greater than 75 microns and a porosity of at least 11%. Preferably, the nickel content of the surface layer of the core is at least 18% and most preferably, the surface layer of the core is of substantially pure nickel. In a preferred embodiment of the process, wherein the core is provided with a substantially pure nickel surface layer, an aluminum layer of at least 100 microns in thickness is deposited on the nickel and then in the interdiffusion treatment, the nickel and aluminum form an $Ni_2Al_3$ alloy layer. It has been found that the $Ni_2Al_3$ grains usually average between about 1 and 75 microns. In a further preferred embodiment of the process, the temperature and time of interdiffusion are adjusted to provide the interdiffused alloy layer with a thickness of between 100 and 400 microns in which the $Ni_2Al_3$ grains average 5 to 60 microns, and in the selective leaching, temperature, time and base concentration are controlled to provide the porous nickel layer with a thickness of 100 to 400 microns and an average porosity of between 15 and 25%. In the interdiffusion step, temperatures are generally maintained below about 1000° C., preferably between 660° and 875° C., and in the selective leaching step, the portion of the aluminum that is selectively leached from the nickel-aluminum alloy layer is generally at least 60% of that originally present in the layer, and preferably between 75 and 95%.

Under typical operating conditions, when electrodes made by the process of this invention are substituted for the usual mild steel cathodes of a conventional brine-electrolysis cell, cell voltage requirements can be reduced by about 315 to 345 millivolts.

BRIEF DESCRIPTION OF THE DRAWINGS

The invention will be better understood by reference to the drawings in which.

DETAILED DESCRIPTION OF THE INVENTION

Conventional commercial brine electrolysis cells for the production of chlorine, hydrogen and caustic usually employ mild steel as the cathode material. Under typical operating conditions at a 190-ma/$cm^2$ current density, such mild steel cathodes have a hydrogen overvoltage of about 380 millivolts. Reduction of this overvoltage can produce a significant savings in energy consumption and cost. The electrodes produced by the process of this invention provide such savings, in that when substituted for the conventional mild steel cathode, they reduce the voltage requirement by about 315 to 345 millivolts.

The characteristics of the porous Raney nickel electrode surface that are most important in achieving these lower hydrogen overvoltage requirements are the thickness of the porous nickel layer and its porosity. When the layer thickness is greater than 75 microns and has a surface porosity of at least 11%, the overvoltage is reduced by at least about 315 millivolts, compared to a conventional mild steel cathode. The porous nickel in the surface layer of the electrode is in the form of agglomerates, generally having an average size of at least 35 microns. In preferred embodiments of the electrode, when the layer thickness is between 100 and 400 microns, and most preferably between 150 and 300 microns, and the surface porosity is between 15 and 25%, and most preferably between 18 and 22%, the overvoltage reduction can amount to about 345 millivolts. In the preferred electrodes the average size of the porous nickel agglomerates is usually between 40 and 400 microns, and more preferably between 50 and 250 microns. The overvoltage reductions are based on operation of the electrode as the cathode in a brine electrolysis cell at a current density of 190 milliamps per square centimeter. All voltage values quoted herein are based on the 190-ma/cm$^2$ current density, although the electrodes are equally suitable for operation over a broad range of other current densities.

Figure 1A:
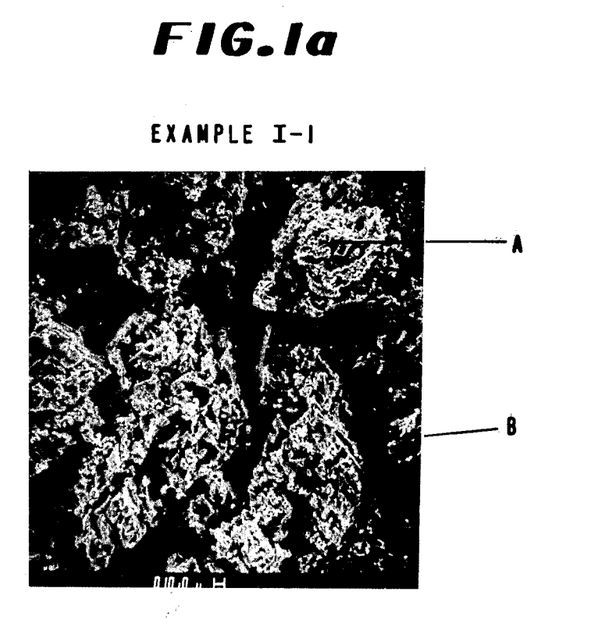
FIG. 1 presents scanning electron photomicrographs of the porous Raney nickel surface of electrodes made by the process of this invention.
Figure 1B:
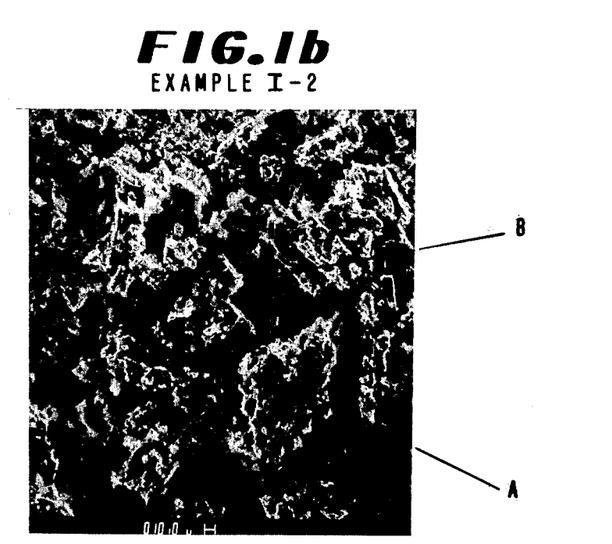

FIGS. 1a and 1b present scanning electron photomicrographs of typical porous Raney nickel surface layers of electrodes made by the process of this invention. Typical agglomerates are labelled A. The dark areas labelled B, represent surface porosity. A photomicrograph of a typical cross section of the electrode, showing the thickness of the porous nickel surface layer is given in FIG. 4c. The effect of the thickness of the porous nickel surface in reducing the cathode potential required in brine electrolysis cells is shown graphically in FIG. 2. Note the rapid rise in cathode voltage as the porous nickel layer thickness is decreased below about 75 microns.

The porous nickel surface layer of the electrode prepared by the process of this invention is formed on a metallic core with which it is in electrical contact. The core material may be any conductive metal or alloy, but is preferably mild steel, nickel or a nickel-bearing alloy. When the core is of a nickel-bearing alloy, the nickel concentration of the alloy is at least 15 weight percent and preferably at least 18 weight percent.

The electrode can be in the form of any conveniently shaped plate or screen. For commercial brine electrolysis cells, screens are preferred.

The electrode may also be provided with an optional, very thin coating of nickel atop the porous nickel surface. The very thin coating, which is preferably 5 to 10 microns thick, improves the mechanical strength and surface stability of the porous nickel layer, without diminishing its electrochemical activity. A photomicrograph of a cross section of the nickel-coated porous nickel layer is given in FIG. 4d.

Figure 3:
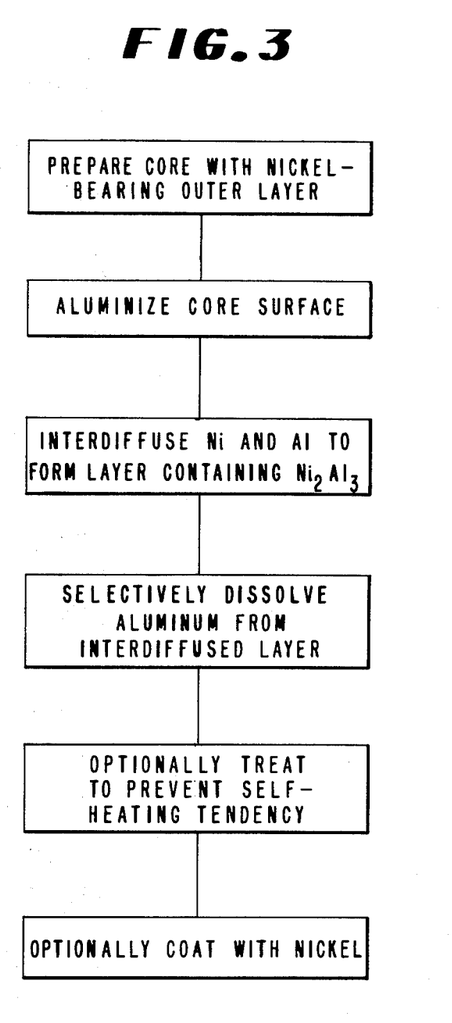
FIG. 3 is a flow sheet of a process of the invention.

In the process of this invention, an interdiffused nickel-aluminum alloy layer is formed, from which aluminum is subsequently selectively leached. This improved process is described in detail below by reference to the specific embodiment shown schematically by the flow sheet given in FIG. 3. The process includes the steps of (a) preparing a metallic core with a nickel-bearing surface layer, (b) aluminizing the surface of the core, (c) interdiffusing the aluminum and nickel, (d) selectively leaching aluminum from the interdiffused material, (e) optionally chemically treating to prevent potential pyrophoricity and (f) optionally coating with nickel to improve the mechanical properties of the final surface.

The metallic core which comprises the starting material for the electrode is prepared to have a nickel-bearing surface layer in which the nickel concentration is at least 15%, and preferably at least 18%, by weight. When the core is of substantially pure nickel or an appropriate nickel-bearing alloy such as Inconel 600, Hastelloy C or 310 Stainless Steel, the core inherently has the desired nickel-bearing surface layer. For cores of other metals or alloys, a nickel coating can be deposited on the core by known techniques, such as metal dipping, electroplating, electroless plating and the like. The nickel-bearing surface layer of the core, whether provided by the core metal itself or as a deposited coating, is conveniently at least 100-microns thick, and preferably at least 150-microns thick. The maximum thickness of the nickel-bearing surface layer is a matter of convenience and economic choice. Although cores in the form of screens or plates, especially screens, are preferred, cores made from foils, wires, tubes or expanded metal are also suitable. The nickel-bearing surface of the core, prior to further processing, is thoroughly cleaned by conventional means, such as chemical cleaning and/or grit blasting, to improve the bond between the nickel-bearing surface of the core and subsequently applied layers.

The cleaned surface of the core is subjected to an aluminizing treatment. By aluminizing, as used herein, is meant that aluminum is brought into intimate contact with the nickel-bearing material at the surface of the core so that when heated during the interdiffusion step the desired nickel-aluminum alloy layer is formed. The aluminizing can be accomplished by any of several known methods, such as flame spraying aluminum onto the surface of the core, dipping the core into an aluminum melt or by use of fused salt electrolysis. When using these methods of aluminizing, an aluminum layer of at least 100-micron thickness is deposited on the nickel-bearing surface of the core. Much thicker aluminum layers, of, for example, greater than 500-micron thickness, perform satisfactorily in the process, but for reasons of economy, aluminum layer thicknesses of between about 150- and 300-microns are preferred.

The interdiffusion step, which is usually the next step in the process, is carried out at a temperature of at least 660° C., i.e., above the normal melting point of aluminum. Higher temperatures, up to about 1000° C., are suitable, with temperatures of 750° to 875° C. being preferred. Usually the interdiffusion is carried out in an atmosphere of hydrogen, nitrogen or an inert gas. This interdiffusion treatment is continued for a time sufficient for the aluminum and nickel to interdiffuse and form a nickel-aluminum alloy layer of at least 85 microns in thickness. When the surface layer of the core is of substantially pure nickel, an interdiffused alloy layer of $Ni_2Al_3$ forms, in which the $Ni_2Al_3$ grains average between 3 and 75 microns in size. Interdiffused nickel-aluminum alloy layers of 100 to 400 microns in thickness are preferred, with best results being obtained when the thicknesses are between 150- and 300-microns. When interdiffused layers of $Ni_2Al_3$ are formed, the $Ni_2Al_3$ grain sizes preferably average between 5- and 60-microns, and most preferably between 10- and 50-microns.

Figure 4A:
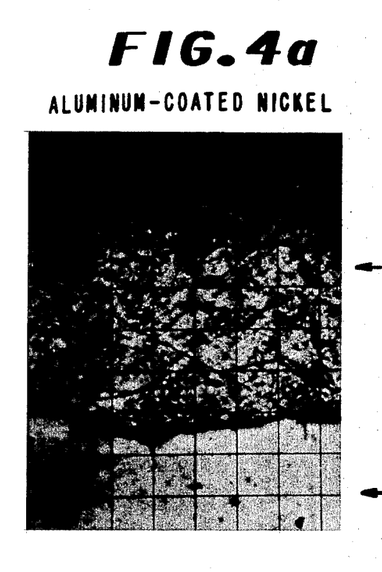
FIG. 4 presents photomicrographs of cross sections of the electrode at different stages of the process of manufacture.

FIGS. 4a,b,c,d represent cross-sections of coatings.

Figure 4B:
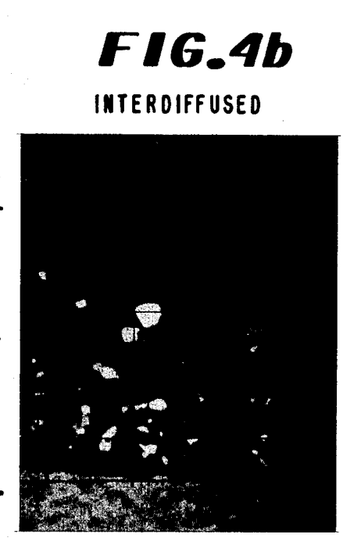
Figure 4C:
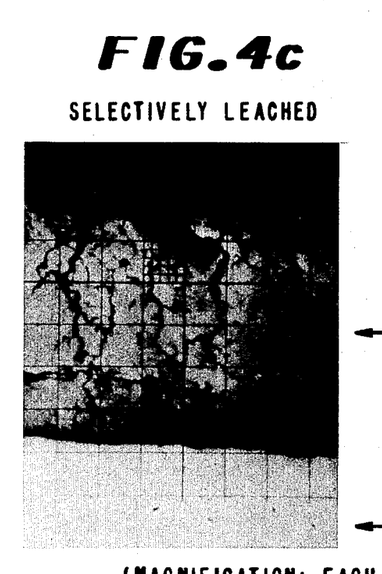
Figure 5A:
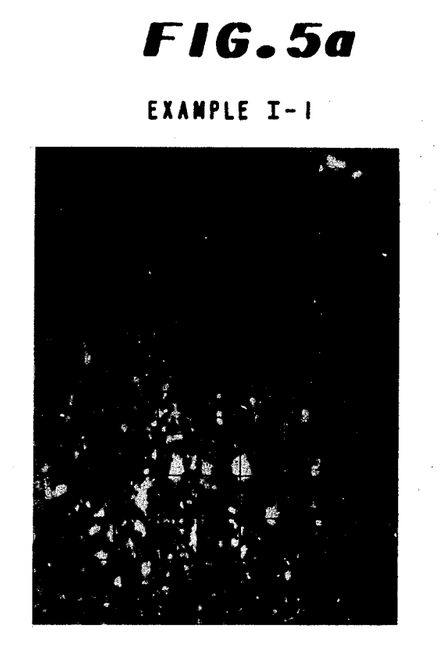
FIG. 5 presents a detailed photomicrograph of a cross section of an interdiffused nickel-aluminum ($Ni_2Al_3$) alloy layer.
Figure 5B:
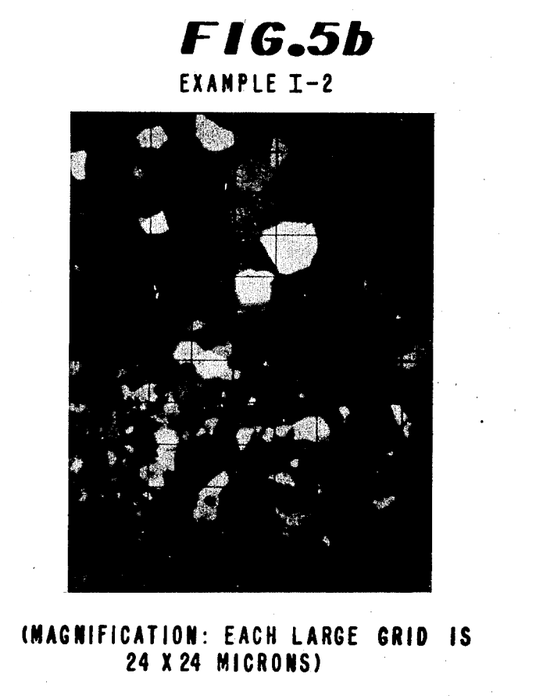

FIG. 4(b) presents a photomicrograph of a cross section of the interdiffused nickel-aluminum alloy layer that was formed by flame-spraying aluminum onto a nickel substrate and then interdiffusing the nickel and aluminum at 760° C. for 8 hours. The photomicrograph shows the nickel core, upon which is a layer of $Ni_2Al_3$, on which is a comparatively thin layer of $NiAl_3$, on which is a layer of substantially nondiffused aluminum. More detailed photomicrographs of the $Ni_2Al_3$ are given in FIGS. 5a and 5b. The active porous nickel that is formed later in the subsequent leaching step is derived almost entirely from the $Ni_2Al_3$ phase. Any nickel formed from the $NiAl_3$ phase is mechanically weak, nonadherent and usually lost from the active surface during the subsequent leaching step.

The size of the $Ni_2Al_3$ grains and the rate at which the thickness of the $Ni_2Al_3$-containing layer grows are highly dependent on the temperature at which the aluminum and nickel are interdiffused. Larger grain size and much faster buildup of the $Ni_2Al_3$-containing layer accompany the use of higher temperature.

Figure 6:
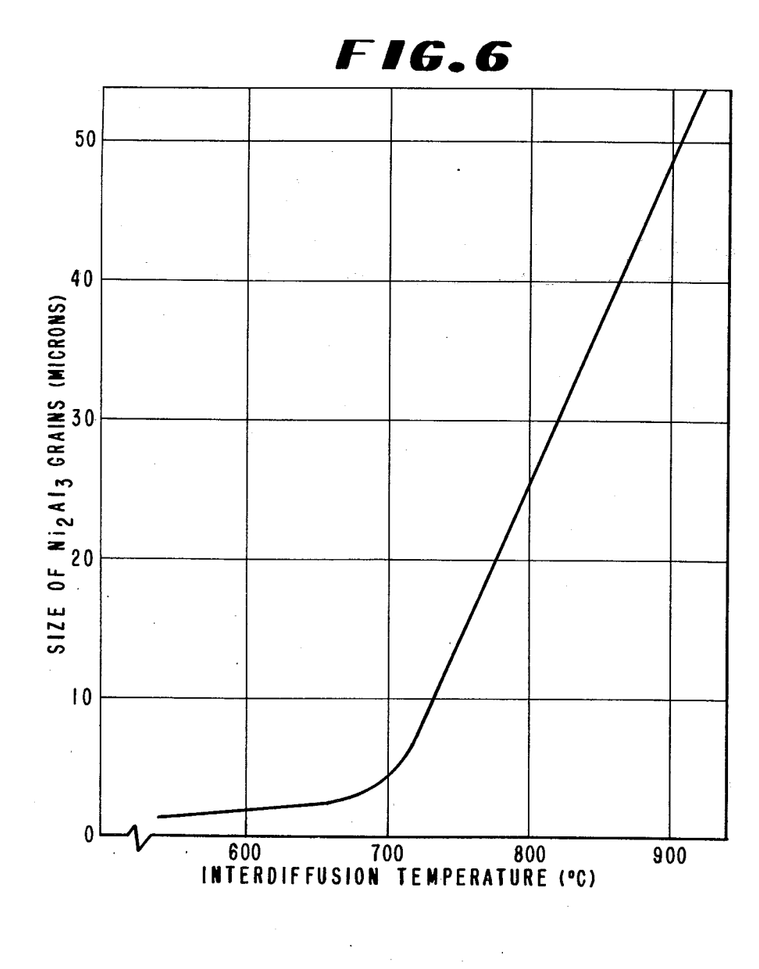
FIG. 6 shows the dependency of the $Ni_2Al_3$ grain size on the interdiffusion temperature.

FIG. 6 shows the dependency of the average size of the $Ni_2Al_3$ grains on the temperature of interdiffusion. Note the rapid increase in grain size that occurs at interdiffusion temperatures of above 660° C., especially above 700° C. At interdiffusion temperatures below 660° C., the size of the $Ni_2Al_3$ grains are smaller than those found desirable for the later formation of the Raney nickel layer.

Figure 7:
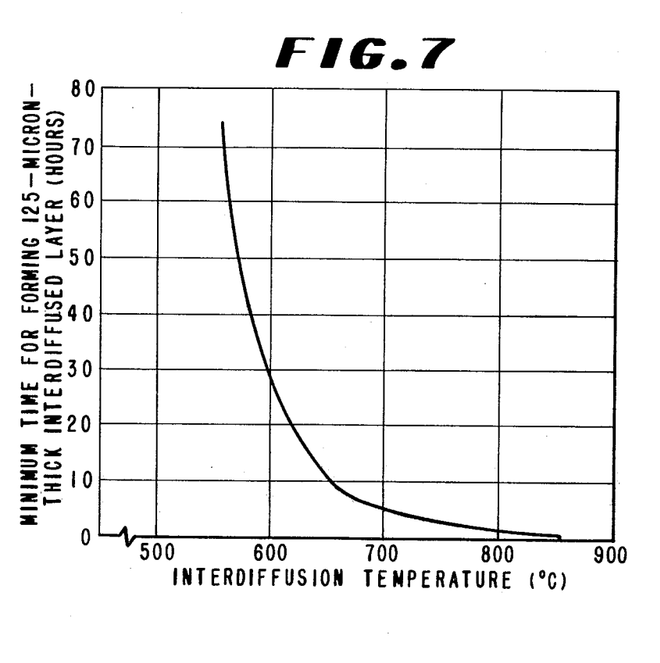
FIG. 7 depicts the time-temperature relationship for buildup of an $Ni_2Al_3$ layer during the interdiffusion step.

FIG. 7 shows, as a function of temperature, the time required for a 125-micron-thick layer of $Ni_2Al_3$ to form on a nickel core that had been flame-sprayed with aluminum. Note the rapidly increasing times that are required to obtain a given thickness of the $Ni_2Al_3$ layer as the temperatures of interdiffusion are decreased below 660° C. For the conditions shown in FIG. 7, formation of the desired layer thickness requires over 74 hours at 560° C. or over 29 hours at 600° C. in contrast to the minimum times of less than 1 hour to about 3 hours for interdiffusion temperatures in the preferred range (i.e., 750°–875° C.) of the process of the invention. Furthermore, as pointed out above, at temperatures below 660° C., the size of the $Ni_2Al_3$ grains are smaller than desired.

During the treatment at temperatures above 660° C., excessively long interdiffusion times are avoided for technical, as well as economic reasons. For similar reasons, temperatures above about 1000° C. are generally avoided. For example, if aluminum is diffused into a nickel-coated-steel core, excessive interdiffusion time or temperature can result in the aluminum "breaking-through" to the steel base of the core; i.e., the aluminum diffuses all the way through the nickel into the steel core. Break-through is accompanied by the formation of a very brittle $FeAl_3$ intermetallic phase, which can significantly undermine the strength of the bond between the core and the interdiffused layer. Also, if interdiffusion is continued too long, all of the available aluminum can be diffused into the nickel such that there is still a large excess of nickel in the interdiffused material. Under these latter circumstances, and also frequently when interdiffusion temperatures of above about 1000° C. are used, an intermetallic phase forms, which does not permit satisfactory subsequent leaching of the aluminum from the intermetallic, and consequently, a highly active porous nickel does not form. By providing sufficient quantities of nickel and aluminum, while avoiding excessively long treatments or excessively high temperatures during interdiffusion, break-through and formation of the undesired intermetallics are avoided.

As described above, the aluminizing and interdiffusion steps are carried out sequentially. However, the steps can also be performed simultaneously by a pack-diffusion technique. For example, a mixture of aluminum and alumina powders and an activator can be packed around a nickel core and then heated in a hydrogen atmosphere at a temperature of 750° C. for about 8 hours to form the desired nickel-aluminum alloy layer.

The formation of the desired nickel-aluminum alloy layer is followed by a selective leaching step, wherein sufficient aluminum is removed from the surface and the nickel-aluminum alloy layer to form an active nickel surface layer having a thickness of greater than 75 microns and a surface porosity of at least 11%. The average size of the Raney nickel agglomerates is generally greater than 35 microns. Such an active layer is shown in cross section in the photomicrograph of FIG. 4(c) and in the surface view of the scanning-electron micrographs of FIG. 2. Generally, a strong aqueous base, such as NaOH, KOH or other strongly basic solution capable of dissolving aluminum, is used in the selective leaching step. Preferably, the selective leaching is carried out in aqueous caustic solutions containing about 1 to about 30 weight percent NaOH. For example, a selective leaching treatment of 20 hours in 10% NaOH at ambient conditions (i.e., temperature is not controlled) or a treatment of 14 hours in 10% NaOH at ambient temperatures followed by 6 hours in 30% NaOH at 100° C. has been found satisfactory for producing porous nickel surfaces of the invention. A preferred selective leaching procedure is carried out first for 2 hours in 1% NaOH, then for 20 hours in 10% NaOH, both of these substeps under conditions in which temperature is not controlled, and finally for 4 hours in 30% NaOH at 100° C. The leaching procedure removes at least about 60%, and preferably between about 75 and about 95%, of the aluminum from the interdiffused alloy layer and provides a porous nickel surface of unusually high electrochemical activity. It is recognized that the leaching conditions can be varied from those mentioned above to achieve effective selective dissolution of the aluminum. However, to assure that surfaces of high electrochemical activity are achieved, it is only necessary that the leaching be continued until the Raney nickel layer is more than 75 microns thick (preferably between 100 and 400 microns, particularly 150 to 300 microns, thick) and has a surface porosity of greater than 11% (preferably between 15 and 25%, especially 18 to 22%).

After the selective leaching, the active nickel coatings may exhibit a tendency to heat when exposed to air. This self-heating tendency could possibly lead to problems of pyrophoricity. However, an optional step of chemically treating the porous nickel layer can be used to eliminate this potential problem. Convenient methods for this chemical treatment include immersing the Raney-nickel-coated electrode for at least one hour and usually less than four hours in a dilute aqueous solution containing, for example, by weight (a) 3% $NaNO_3$ or (b) 3% $K_2Cr_2O_7$ or (c) 3% $NaClO_3$ and 10% NaOH. These treatments eliminate the self-heating tendency of the Raney nickel surface without diminishing its electrochemical activity or mechanical properties.

Figure 4D:
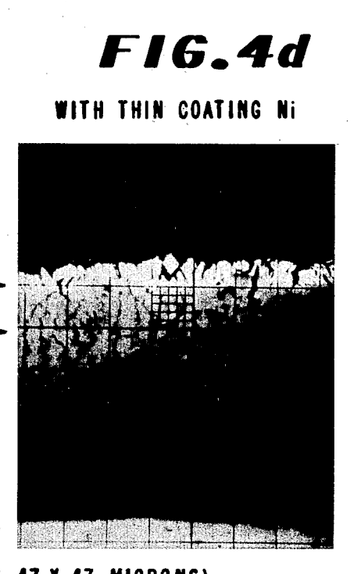

Although the active porous nickel surface layers, as prepared by the preceding steps, have satisfactory mechanical properties and low tendency to spall, compared with many of the Raney nickel surfaces of the prior art, the mechanical properties of the layer can be improved by optionally coating a very thin layer of nickel onto the porous surface. This nickel layer, which is preferably 5 to 10 microns thick and can be applied from conventional electroless nickel or nickel electroplating baths, enhances the mechanical strength of the porous nickel layer without diminishing its electrochemical activity. In the photomicrograph of FIG. 4(d) the very thin nickel layer can be seen atop the porous nickel layer.

Advantageous use can be made of the electrodes of the invention, especially as hydrogen-evolution cathodes of cells intended for the electrolysis of brine, water or the like. The electrodes are particularly preferred for use in brine electrolysis cells, wherein the high electrochemical activity of the nickel surface remains constant for long periods of extended continuous use. When the electrode is intended for use in a brine-electrolysis diaphragm cell, the diaphragm can be applied directly to the porous nickel surface of the electrode. For example, a tubular screen electrode of the invention, with suction established through the inside of the tube, can be immersed in an aqueous dispersion of polytetrafluoroethylene fibers and asbestos fibers. The fibers are sucked onto the outer surface of the screen until a diaphragm of the desired thickness is formed. After removal of the suction, water is removed from the assembly, as for example, by heating at 95° C. for 5 hours. The assembly is then heated at 350° C. for about ½ hour in an inert atmosphere, to complete the diaphragm fabrication. As is known in the art, the satisfactory operating lifetime of such diaphragms is not nearly as long as that of the cathodes of the brine electrolysis cells. Economics dictates that the diaphragms must be changed several times during the operating life of the cathode. With electrodes of the present invention, the diaphragms can be readily stripped from the porous nickel surface and replaced many times with insignificant detriment to the electrochemical activity or mechanical properties of the electrode. Similarly satisfactory results are also obtained with other diaphragm materials and with membrane materials (such as cationic exchange membranes of hydrophilic phosphonated fluorocarbontelomers blended with inert fibers such as asbestos, glass and polytetrafluoroethylene).

Test Methods

The various parameters associated with the present invention are measured by the techniques described below.

Thickness of Porous Nickel Layer

Metallographic cross sections are prepared perpendicular to the surface of the electrode. Photomicrographs are taken of typical areas of the cross section. A convenient magnification, usually between 150 and 400×, permits inclusion of the entire thickness of the porous nickel layer in the photomicrograph. The thickness of the porous nickel layer is determined by measuring the layer thickness depicted in the photomicrograph and dividing by the magnification. At least five such measurements are made on at least three micrographs and then averaged to obtain the thickness of the porous nickel layer of the electrode. For electrodes of the invention, this provides thickness measurements having a coefficient of variation of generally less than 5%. Photomicrographs of the type that can be used to make these thickness measurements are given in FIGS. 4(c) and 4(d).

Surface Porosity and Average Agglomerate Size

Scanning-electron micrographs are prepared of randomly selected areas of the surface of the Raney nickel layer of the electrode. The magnification is conveniently set between about 100 and 500×. The micrograph is printed on photographic paper of uniform weight. As can be seen from the scanning-electron micrograph of FIG. 1, the individual agglomerates of the porous nickel of the electrodes of the invention (labelled "A") are readily identifiable; the dark areas between and within the agglomerates (labelled "B") depict the porous regions. Although both photomicrographs of FIG. 1 were prepared at the same magnification to provide a direct comparison between the appearance of two samples, it is frequently more convenient, for the purposes of the present measurements, to select a different magnification for each sample, the magnification depending on the size of the agglomerates being examined. Generally, a magnification is selected so that at least five full agglomerates are displayed in the photomicrograph. The surface porosity and the average agglomerate size can be measured from the micrographs as follows:

1. From a prepared micrograph depicting a typical area of the surface of the electrode, cut away the agglomerates that are only partially shown at the edges of the micrograph. In deleting the partial agglomerates, cut along the centerline of the porous region between the partial agglomerate and the closest whole agglomerate. Measure the area of the remaining portion of the micrograph. The area of the micrograph divided by the square of the magnification equals the actual area, S, of the surface being analyzed. Determine the weight, W, of the cut-out area.

2. Count the number of agglomerates, N, within the cut-out area of the micrograph that lie in the plane of the surface of the specimen. Those that clearly lie in a plane below the surface of the specimen are not counted.

3. Subdivide the cut-out portion of the micrograph into subcuttings of areas depicting the agglomerates in the plane of the specimen surface and areas depicting porous regions in the plane of the specimen surface. In making these subdivisions care is taken to include in the porous area of the specimen surface, the areas of the cut-out micrograph that are shown as (a) black regions, (b) agglomerates that are clearly beneath the plane of the specimen surface and (c) sides of agglomerates, lying below and at an angle to the plane of the specimen surface (usually appearing as a somewhat lighter shade than the black porous regions).

4. Weigh the cuttings representing the agglomerates, $w_a$, and the cuttings representing the porous regions, $w_p$, and assure that no cuttings were lost by checking that $w_a + w_p = W$.

5. Calculate the surface porosity, P, expressed as a percentage, from $P = (w_p/W)100$.

6. Calculate the agglomerate size, D, from $$D = \left\{ \frac{S}{N} \left( 1 - \frac{P}{100} \right) \right\}^{\frac{1}{2}}$$

7. Make replicate measurements to determine average values for the samples studied. For electrodes of the invention, five replicate measurements are usually sufficient to result in average values of P and D having coefficients of variations of less than 10%.

An alternative method for measuring the average agglomerate size, D, is to (1) cut out at least five typical agglomerates from each of five micrographs taken at the same magnification, X, of the surface of the electrode; (2) determine the total weight, w, and number, n, of the cut-out agglomerates; (3) measure K, the weight per unit area of the micrograph paper; and (4) calculate the average agglomerate size from $$D = \left\{\frac{(w/n)}{K}\right\}^{\frac{1}{2}} \left(\frac{1}{X}\right)$$

Nickel-Aluminum Alloy Layer Prior to Leaching

Metallographic cross sections are prepared perpendicular to the surface of the precursor of the electrode, that is, after the interdiffusion treatment but prior to the selective leaching step. Plane polarized light is used. Photomicrographs are taken of typical areas of the cross section to include the layer containing the nickel-aluminum alloy. Convenient magnifications are between 150 and 500×. The thickness of the nickel-aluminum alloy layer is then determined in the same manner as described above for the thickness of the porous nickel layer.

When the nickel-aluminum alloy layer is of $Ni_2Al_3$, measurement of the size of the $Ni_2Al_3$ grains is facilitated by superimposing a grid on the photomicrograph of the layer. Ten squares of the grid are randomly selected from the middle 80% of the $Ni_2Al_3$-containing layer. The total number of grains, Z, within the boundary of each square is counted. The area of the grid on the photomicrograph divided by the square of the magnification is the actual area A, of the layer under examination. The size, d, of the $Ni_2Al_3$ grains in the layer, for each grid area examined, is then calculated from $d=(A/Z)^{\frac{1}{2}}$. This formula holds for the layers that consist essentially of $Ni_2Al_3$ grains. The average $Ni_2Al_3$ grain size for a given sample is then simply the average size of the grains for each the ten grids. To characterize the $Ni_2Al_3$ grain size in the precursor of the electrode of the invention, at least three photomicrographs of the cross section are subjected to the above analysis and result in a measurement that has a coefficient of variation of less than 5%. Typical cross section photomicrographs, to which this technique can be applied, are shown in FIGS. 4(b) and 5.

Metallographic Specimens

The cross sections to be subjected to the micrographic examinations described above are prepared as follows. A sample is cut and sectioned by use of a diamond saw operating at low speed. The specimen is then mounted in an epoxy resin. Convenient dimensions for the cross section of the specimen are about 6 by 13 millimeters. Primary polishing of the specimen is carried out on a polishing wheel equipped with silicon carbide papers of grades 240A, 400A and 600A. Fine polishing is then accomplished by use of (a) 1.0-micron levigated α-alumina on a felt-covered wheel and then (b) 0.05-micron levigated γ-alumina on a micro-cloth-covered wheel.

Electrochemical Measurements

Figure 8:
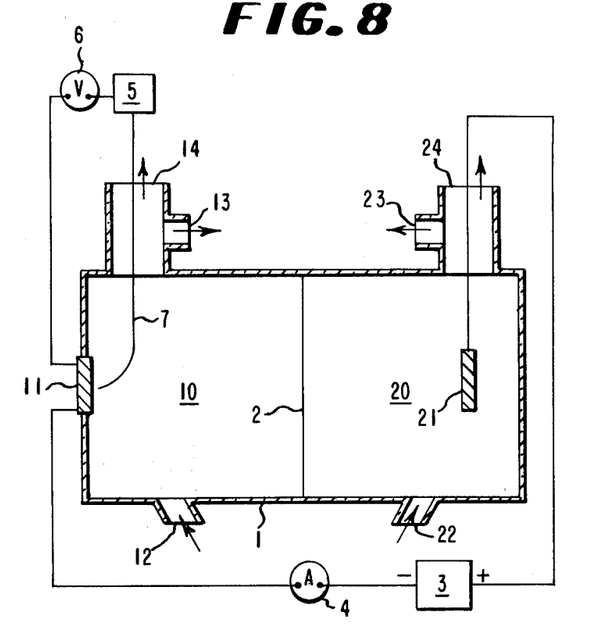
FIGS. 8 and 9 are schematic diagrams of electrolytic test cells for determining the voltage characteristics of plate and screen cathodes, respectively.

A schematic diagram of an electrochemical test cell, used for measuring the cathode potentials of the various plate electrodes of the examples below, is given in FIG. 8.

Test cell 1, made of glass, is divided by diaphragm 2 into two compartments, cathode compartment 10 and anode compartment 20. The diaphragm, which is sealed in place by caustic-resistant gaskets (not shown), is made of Nafion® 701, a microporous laminate of a fabric of Teflon® polytetrafluoroethylene fibers and a homogeneous, 0.18-mm-thick film of 1100 equivalent weight perfluorosulfonic acid resin.

A platinum anode 21 is installed in the anode compartment. Test electrode 11, which becomes the cathode of the test cell, is installed at the end of the cathode compartment by means of flanges and gaskets (not shown). A 1.5-cm-diameter circular area (i.e., 1.767 $cm^2$) of the Raney nickel surface of the test electrode is exposed to the interior of the cathode compartment. The cathode and anode are connected electrically to controllable voltage source 3. Ammeter 4 is connected in the line between the two electrodes.

Preheated catholyte, consisting of an aqueous solution, containing 12 weight percent sodium hydroxide and 16 weight percent sodium chloride, is pumped through inlet 12 into the cathode compartment at a rate which establishes an overflow through outlet 13. The catholyte is maintained at 96° C. Similarly, anolyte, consisting of an aqueous solution containing 16 weight percent sodium chloride is pumped through inlet 22 into the anode compartment and overflowed through outlet 23. The salt concentration of the catholyte is typical of that encountered in commercial brine electrolysis cells. Since the objective of the determination to be made in this apparatus is the measurement of cathode potential rather than overall cell voltage, the salt concentration in the anolyte was set at 16% for operating convenience (i.e., to avoid line plugging by crystallization) in preference to the 24 to 26% NaCl concentrations typically encountered in commercial cells. The use of separate catholyte and anolyte feeds, rather than a single brine feed, assures better control of the desired catholyte composition. The catholyte and anolyte flows are controlled so that there is a small flow of solution from the anode to the cathode compartment, which flow is sufficient to assure ionic conductivity across the cell, but insufficient to significantly affect the catholyte composition.

Luggin capillary 7, installed in the cathode compartment, is connected to Saturated Calomel Reference Electrode (SCE) 5, which in turn is connected through voltmeter 6, to the test electrode. A Luggin capillary is a probe which, in making ionic or electrolytic contact between the cathode and the reference electrode, minimizes the voltage drop due to solution resistance and permits direct measurement of the cathode potential with respect to the reference electrode.

To determine the cathode potential of a test electrode, a voltage is impressed by source 3 between the anode and test electrode (i.e., cathode), such that a current density of 190 ma/$cm^2$ is established at the cathode. The current density is the current measured by ammeter 4 in milliamps divided by the area of the Raney nickel surface of the test electrode exposed to catholyte (i.e., 1.767 $cm^2$). Hydrogen gas, generated at the cathode is removed from the cathode compartment through gas outlet 14. Chlorine gas, generated at the platinum anode, is similarly removed through gas outlet 24. The cell is operated in this manner for at least two hours prior to reading the cathode potential directly from voltmeter 6.

Figure 9:
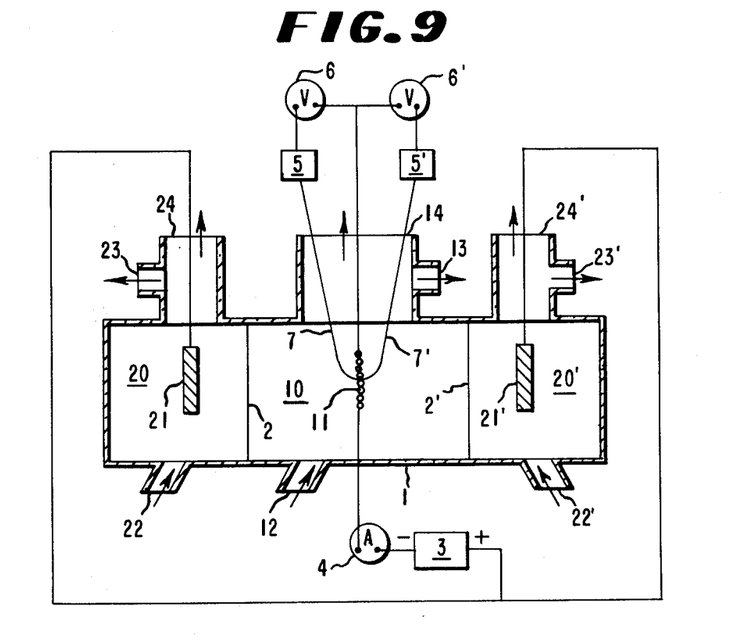

A schematic diagram of the test cell for measuring the cathode potential of a screen electrode is given in FIG. 9. Most of the essential features of the plate electrode test cell of FIG. 8 have been included in the screen test cell. However, two anodes are used in the screen test cell to improve the potential distribution over the irregular surface of the screen and to permit measurement of the potentials on both sides of the cathode. The numerals on FIG. 9 refer to the correspondingly numbered parts on FIG. 8. Parts in the second anode compartment are designated with the same numeral as parts in the first anode compartment, except that each second-anode-compartment numeral carries a prime. The concentrations and temperatures of the catholyte and anolyte in the test cell of FIG. 9 are the same as those for the test cell of FIG. 8. Although designed for screen electrodes, the test cell of FIG. 9 is also operable with plate electrodes.

In measuring the current density of screen cathodes, the projected area of the surface of the screen exposed to catholyte is corrected so that the current density can be based on the effective surface area. The method used herein for determining the correction factor is as follows. The cathode potential for the screen cathode, as measured on voltmeters 6, 6', is set by adjustment of voltage source 3, at the same value as is established at 190 ma/cm$^2$ for the cathode potential of a plate electrode having a porous nickel surface layer of the same thickness, porosity and agglomerate size and having been made in the same manner as the Raney nickel surface layer of the screen. After at least two hours of operation of the cell in this manner, the apparent current density is determined as the current, measured with ammeter 4, divided by the projected exposed area of the screen. The apparent current density divided by 190 ma/cm$^2$, then gives the correction factor by which the projected area is multiplied to give the effective surface area of the screen.

EXAMPLES

In each of the examples, electrodes are prepared and then tested as cathodes in brine electrolysis test cells. All characterizations are carried out in accordance with the test procedures described above. Unless stated otherwise, all compositions are given as weight percentages.

EXAMPLE I

Four groups of electrodes having porous Raney nickel surfaces in accordance with the invention are prepared. The preparation method for each group differs from that of the other groups only in the conditions of the interdiffusion step.

A 1.6-mm-thick nickel sheet, assaying at least 99% nickel, is cut into coupons measuring about 5.1 by 7.6 cm. The coupons, which are to become the cores of the electrodes are thoroughly cleaned by degreasing with acetone, lightly etching with 10% HCl, rinsing with water and after drying, grit blasting with No. 24 grit Al$_2$O$_3$ at a pressure of 3.4 kg/cm$^2$ (50 psi).

The cleaned nickel coupons are aluminized by flame-spraying a 305-micron-thick coating of aluminum on the surface of each nickel coupon. A conventional plasma-arc spray gun operating at 13 to 16 kilowatts at a distance about 10 cm from the coupon is used with aluminum powder of −200 to +325 mesh.

The aluminized nickel coupons are divided into four groups. Each group is heat treated in a nitrogen atmosphere to interdiffuse the nickel and aluminum and form an Ni$_2$Al$_3$ layer. The times and temperatures of the interdiffusion heating are as follows:

| Group 1 | 710° C. for 12 hours |
| Group 2 | 760° C. for 8 hours |

-continued

| Group 3 | 860° C. for 4 hours |
| Group 4 | 910° C. for 2 hours |

After heat treating, the coupons are allowed to cool in a current of nitrogen for about two hours. Samples are taken from each group for metallographic examination of the interdiffused layer.

The remaining coupons from each group are then subjected to a leaching treatment wherein the aluminum is selectively removed from the interdiffused layer to leave an active porous nickel surface on the coupon. The leaching treatment consists of immersing the interdiffused coupons in 10% NaOH for 20 hours, without temperature control, followed by 4 hours in 30% NaOH at 100° C. The coupons are then rinsed with water for 30 minutes.

Samples from each group of the electrodes are then subjected to metallographic and scanning-electron-microscope examination. Cathode potential measurements are made with the apparatus of FIG. 8.

The measured characteristics of the interdiffused Ni$_2$Al$_3$ layer, the final porous nickel surface layer and the cathode potential of each group of electrodes are summarized in Table I.

Comparisons

Electrodes having porous nickel surfaces and methods of preparation that are outside the present invention are prepared for comparison with the electrodes of Example I. The measured characteristics of the electrodes of these comparisons are included in Table I.

Electrode A

An aluminized nickel coupon of the same dimensions and aluminized by the same technique as in Example I is heated for about 6 hours at 590° C. in a stream of hydrogen to interdiffuse the aluminum and nickel. The interdiffused coupon is leached in 25% NaOH for 8 hours at 90° C., to form a porous nickel surface and then is rinsed with water for 30 minutes.

Comparison of the measured characteristics of electrode A and the electrodes of Example I, summarized in Table I, shows that the interdiffused Ni$_2$Al$_3$ precursor layer thickness, porosity and agglomerate size of electrode A are considerably smaller than the corresponding characteristics of the electrodes of Example I, and, that the cathode potential of electrode A is undesirably higher.

Electrode B

A thoroughly cleaned austenitic stainless steel coupon containing 18% chromium and 8% nickel and measuring about 5.1 cm by 7.6 cm and 1.6-mm thick is electroplated in a Watts bath to form a 1-mm-thick coating of nickel on the steel surface. An 0.5-mm thick coating of aluminum is then flame-sprayed on the nickel-plated surface. The composite which is formed is then heated for about 6 hours at 650° C. in a stream of hydrogen to interdiffuse the aluminum and nickel. The interdiffused coupon is immersed in 25% NaOH at 90° C. for 8 hours and finally washed in running water for 30 minutes.

Comparison of the measured characteristics of electrode B and of the electrodes of Example I, summarized in Table I, shows that the size of the grains in the Ni$_2$Al$_3$ precursor layer and the porosity and agglomerate size of the porous nickel layer of electrode B are smaller than those of the Example I electrodes, and that the cathode potential of electrode B is undesirably higher.

Electrode C

A thoroughly cleaned mild steel coupon measuring about 5.1 by 7.6 cm and 1.6-mm thick is electroplated simultaneously with nickel and zinc. A plating solution of 1 mole/liter of $NiCl_2.6H_2O$, 1 mole/liter of $ZnCl_2$ and 30 grams/liter of $H_3BO_3$, having a pH of 4.0 and maintained at 40° C. is used with a current density of 0.775 amps/cm$^2$ for about 60 minutes to accomplish the plating. The plated coupon is then immersed in 0.5 M NaOH at room temperature for 24 hours and then for two more hours at 90° C. to remove zinc from the surface. The thusly formed porous nickel surface is then thoroughly washed in water.

The summary of characteristics given in Table I shows that the porous nickel surface layer of electrode C is much thinner than the porous nickel surface layers of the Example I electrodes and that the cathode potential of electrode C is much higher.

Electrode D

A thoroughly cleaned 5.1 cm by 7.6 cm by 1.6 mm nickel coupon is coated by flame spraying with a nickel-aluminum alloy. A conventional plasma flame-spray gun, operating at 15 to 19 kilowatts is used with a commercial Ni-Al powder containing 52% Ni and 48% Al. Initially the nickel coupon is positioned about 12½ cm from the nozzle of the spray gun and a 25-micron thick layer of the Ni-Al alloy is sprayed over the entire surface. The coupon is then repositioned to 25 cm from the nozzle and flame sprayed again to build up a surface coating of 500 micron thickness. The coated coupon is then leached in 5% NaOH in three sequential steps: (1) at ambient conditions until hydrogen evolution stops, (2) at 50° C. until hydrogen evolution again stops and (3) at 80° C. until there is no further hydrogen evolution. Finally, the porous nickel surface formed by the leaching is thoroughly rinsed with water.

Table I shows that the average grain size in the precursor $Ni_2Al_3$ layer and the porosity and agglomerate size of the porous nickel layer of electrode D are much smaller than those of Example I electrodes and that electrode D has an undesirably higher cathode potential.

Electrodes E and F

A pack-diffusion technique is used in the preparation of electrodes E and F. For electrode E a thoroughly cleaned 5.1 cm by 7.6 cm by 1.6 mm nickel coupon is placed in a pack consisting of 40% aluminum powder, 58% alumina powder and 2% ammonium chloride. The nickel coupon and the surrounding powder mixture are heated in a hydrogen atmosphere for 8 hours at 900° C. to produce a nickel-aluminum alloy ($Ni_2Al_3$) coating on the coupon. After cooling to room temperature, the coated coupon is then immersed in 6N NaOH at 90° C. for about 16 hours to form a porous nickel surface, which is then thoroughly washed with water for 30 minutes. For electrode F, the same procedure as for electrode E is used, except that the powder pack of electrode E is reused after coarse lumps are broken up or removed from the mixture and the mixture is re-blended with an additional 2% of ammonium chloride.

Table I shows that the porosity of the porous nickel layer of electrodes E and F is low, as compared to the porosity of Example I electrodes, and that the cathode potentials of electrodes E and F are undesirably higher.

EXAMPLE II

This example illustrates the effects of the interdiffusion conditions and the subsequent leaching conditions on the thickness of the porous nickel layer produced and on the cathode potential of the electrodes.

Fourteen electrode samples are prepared starting with nickel cores measuring 5.1 cm by 7.6 cm by 1.6 mm, that are flame-sprayed with aluminum by the same technique as in Example I. The aluminum and nickel are then interdiffused under a variety of conditions ranging from 64 hours at 560° C. to 1 hour at 860° C. Aluminum is then selectively leached from the interdiffused layer by immersion in 10% NaOH for 20 hours at ambient temperatures. As noted below, in some runs an additional leaching treatment is used. The thickness of the various layers produced by these procedures and the cathode potential of the resultant electrodes are given in Table II.

Figure 2:
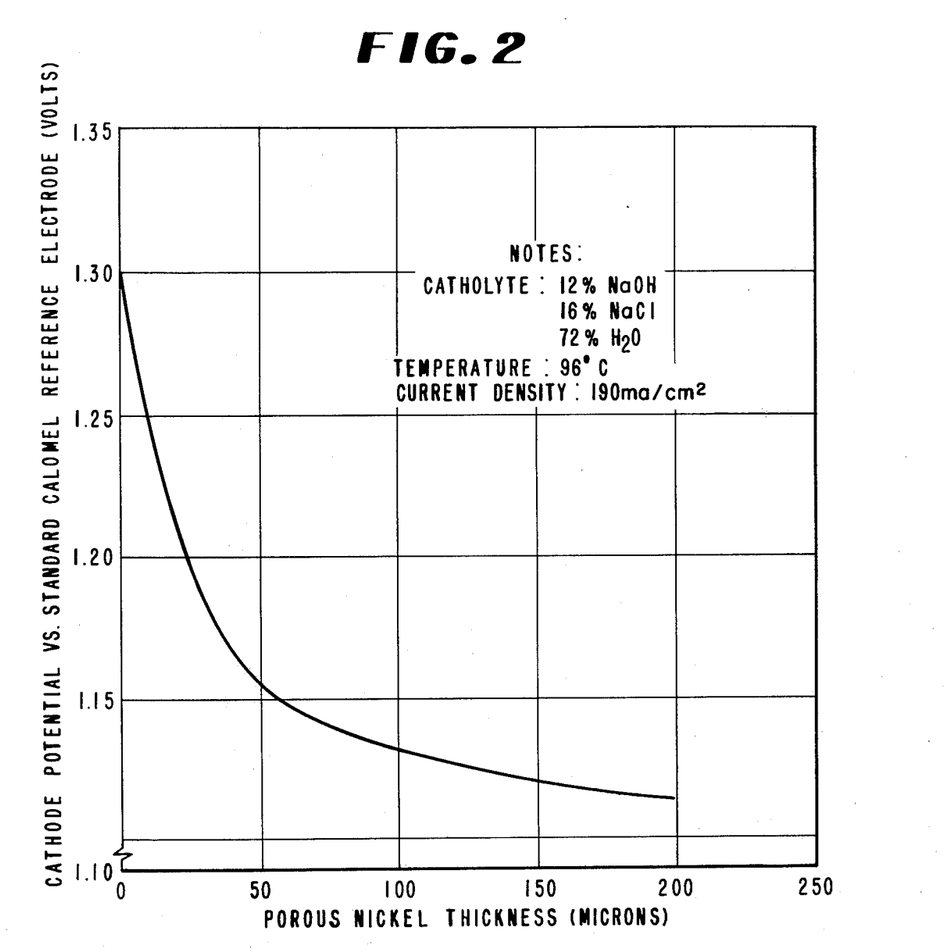
FIG. 2 graphs the relationship between cathode potential and the thickness of the porous nickel layer of the electrodes.

The data of Table II, along with additional similarly obtained data, such as those for Example III below, were used to establish the dependency, plotted in FIG. 2, of the cathode potential on the thickness of the porous nickel layer and the relationship, plotted in FIG. 7, of the time required to develop a given thickness of the $Ni_2Al_3$ layer as a function of interdiffusion temperature. These figures and Table II show that (1) longer heat treatments and higher temperatures generally provide thicker layers of the $Ni_2Al_3$ precursor and (2) thicker final porous nickel layers, especially at thicknesses of greater than 75 microns, provide more active electrodes. To increase the thickness and porosity of the porous nickel layer, and thereby increase the electrochemical activity of the electrode, additional leaching can be effective. This is shown by the results of runs 3', 11', 13' and 14', wherein the electrodes from runs 3, 11, 13, and 14, respectively, were subjected to additional leaching for four hours in 30% NaOH at 100° C. As shown in Table II, these additionally leached electrodes had thicker porous nickel layers, less residual $Ni_2Al_3$ and improved (i.e., lower) cathode potentials.

The $Ni_2Al_3$ grain size of the electrode samples interdiffused at temperatures between 660° C. and 860° C. are between 3 and 50 microns. Of these samples, those having a porous nickel layer thickness of greater than 75 microns also have a porosity of at least 11% and an agglomerate size of at least 35 microns.

EXAMPLE III

Nine electrode samples having nickel-plated mild steel cores are prepared. For each sample, a mild steel coupon, measuring 5.1 cm. by 7.6 cm by 1.6 mm, is electroplated with nickel in a Watts bath and then flame-sprayed by the techniques of Example I with an aluminum coating of about 250 to 300 micron thickness. The sample is then subjected to an interdiffusion heat treatment, after which it is selectively leached under the same conditions as in Example II. The conditions of interdiffusion and the thicknesses of the various layers produced are summarized in Table III. As can be seen from Table III, except for sample 1, which has a porous nickel layer thickness of only 62 microns, all samples have desirably low cathode potentials. Samples 2 through 9 also had $Ni_2Al_3$ grains of between 3 and 50 microns in the interdiffused layer as well as a porosity of at least 11% and an agglomerate size of at least 35 microns in the porous nickel layer.

EXAMPLE IV

This example illustrates the preparation of electrodes having Raney nickel surfaces on different metal cores and compares the cathode potentials of these electrodes and electrodes having porous surfaces of Raney metals outside the invention.

Metal coupons measuring 5.1 cm by 7.6 cm by 1.6 mm are flame sprayed by the techniques of Example I, with a 250 to 350 micron thickness of aluminum and are then heated to assure sufficient interdiffusion of the aluminum with the metal of the coupon so that upon subsequent selective leaching in 10% NaOH for 20 hours, a Raney metal layer of greater than 75 microns is formed. The cathode potentials of the electrodes are then measured. The results of the measurements which are summarized in Table IV, show that porous nickel derived from a substrate containing at least 15% nickel is more active (i.e., has a lower cathode potential) than other Raney metal surfaces. This superiority is clearly shown by comparison of the cathode potential of samples 1–6, with those of samples a–f.

EXAMPLE V

A screen electrode is prepared in this example. A 2.5 cm by 1.25 cm sample of a 6-mesh mild-steel screen having a wire diameter of 2 mm is cleaned with acetone and grit blasted with No. 24 $Al_2O_3$ grit at a pressure of 3.5 kg/cm$^2$ (50 psi) and then electroplated in a Watts bath with a 150-micron-thick coating of nickel. The screen, after a second grit blasting, is then aluminized with a 250-micron-thick layer of aluminum, applied by flame-spraying, as in Example I. The aluminum and nickel are interdiffused to form a nickel-aluminum alloy layer of greater than 100-micron thickness in which the $Ni_2Al_3$ grains average more than 15 microns in size. This is accomplished by placing the screen in a tube furnace, preheated to 760° C., holding the screen at this temperature in a nitrogen atmosphere for eight hours, then stopping the heating and allowing the screen to cool in a current of nitrogen in the cold zone of the furnace for an additional two hours. The heat-treated screen is then subjected to selective leaching by sequential immersion in aqueous baths of (1) 1% NaOH for two hours, (2) 10% NaOH for twenty hours, (3) 30% NaOH until hydrogen evolution has stopped, after which the bath temperature is raised to 100° C. and held at this temperature for four hours. The screen is then thoroughly washed for 30 minutes in running water. The porous nickel layer thus produced is at least 100 microns thick and has a porosity of greater than 18% and an average agglomerate size of greater than 50 microns. The screen, when tested as a cathode in the apparatus of FIG. 9, exhibits an effective area of about four-and-a-half times that of a correspondingly prepared plate electrode, and has a cathode potential of 1.122 volts at a current density of 190 ma per square centimeter of effective area.

Table I

| | Comparison of Electrodes | | | | | |
|---|---|---|---|---|---|---|
| | $Ni_2Al_3$ Precursor[1] | | Final Porous Nickel[1] | | | Cathode |
| | Layer Thickness | Grain Size | Layer Thickness | % Porosity | Agglomerate Size | Potential[2] Volts |
| Electrodes of Example I | | | | | | |
| 1 | 259 | 5 | 224 | 18.2 | 49 | 1.123 |
| 2 | 305 | 16 | 297 | 21.4 | 115 | 1.119 |
| 3 | 292 | 39 | 290 | 19.3 | 244 | 1.116 |
| 4 | 310 | 53 | 305 | (3) | (3) | 1.133 |
| Electrodes of Comparison | | | | | | |
| A | 58 | 2 | 53 | 7.4 | 28 | 1.165 |
| B | 132 | 2.5 | 119 | 9.7 | 34 | 1.142 |
| C | (4) | (4) | 25 | 13.2 | 37 | 1.201 |
| D | 510 | <1 | 510 | 7.3 | 24 | 1.147 |
| E | 254 | 18 | 246 | 8.6 | 39 | 1.176 |
| F | 296 | 12 | 279 | 9.3 | 59 | 1.143 |

Notes:
[1]Layer thickness, grain size and agglomerate size are in microns.
[2]Cathode potential is measured versus a standard colomel reference electrode at 190 ma/cm$^2$ in catholyte containing 12% NaOH, 16% NaCl and 72% $H_2O$ at 96° C.
[3]No measurement made
[4]The precursor layer is a 29-micron thick layer of a nickel-zinc alloy in which the average grain size is less than 1 micron.

Table II

| | Effects of Interdiffusion and Leaching Conditions* | | | | | |
|---|---|---|---|---|---|---|
| | Thickness of Flame-Sprayed Aluminum | Interdiffusion Conditions | | Thicknesses | | Cathode Potential Volts |
| | | | | Precursor $Ni_2Al_3$ Layer | Final Porous Ni | |
| Example II Sample | | °C. | hours | | Porous Nickel | Residual $Ni_2Al_3$ |
| 1 | 305 | 560 | 64 | 105 | 90 | 15 | 1.138 |
| 2 | 305 | 600 | 16 | 92 | 59 | 26 | 1.149 |
| 3 | 305 | 600 | 32 | 130 | 76 | 54 | 1.139 |
| 3' | 305 | 600 | 32 | 130 | 125 | 5 | 1.129 |
| 4 | 102 | 620 | 6 | 100 | 75 | 25 | 1.150 |
| 5 | 152 | 660 | 4 | 94 | 68 | 26 | 1.144 |
| 6 | 305 | 660 | 8 | 118 | 118 | 0 | 1.132 |

Table II-continued

Effects of Interdiffusion and Leaching Conditions*

| Example II Sample | Thickness of Flame-Sprayed Aluminum | Interdiffusion Conditions °C. | Interdiffusion Conditions hours | Precursor Ni₂Al₃ Layer | Final Porous Ni — Porous Nickel | Final Porous Ni — Residual Ni₂Al₃ | Cathode Potential Volts |
|---|---|---|---|---|---|---|---|
| 7 | 152 | 660 | 16 | 136 | 102 | 34 | 1.137 |
| 8 | 305 | 660 | 16 | 167 | 110 | 57 | 1.136 |
| 9 | 152 | 760 | 4 | 144 | 117 | 27 | 1.130 |
| 10 | 305 | 760 | 4 | 141 | 100 | 41 | 1.134 |
| 11 | 305 | 760 | 8 | 159 | 102 | 57 | 1.134 |
| 11' | 305 | 760 | 8 | 159 | 159 | 0 | 1.121 |
| 12 | 305 | 860 | 1 | 165 | 96 | 69 | 1.141 |
| 13 | 305 | 860 | 4 | 261 | 183 | 78 | 1.131 |
| 13' | 305 | 860 | 4 | 261 | 200 | 61 | 1.116 |
| 14 | 305 | 860 | 8 | 314 | 58 | 256 | 1.148 |
| 14' | 305 | 860 | 8 | 314 | 145 | 169 | 1.126 |

*Note: See footnotes 1 and 2 of Table I.

Table III

Electrodes of Example III*

| Sample | Thickness of Electro-Plated Nickel | Interdiffusion Conditions °C. | Interdiffusion Conditions hours | Precursors Ni₂Al₃ Layer | Final Porous Ni — Porous Nickel | Final Porous Ni — Residual Ni₂Al₃ | Cathode Potential Volts |
|---|---|---|---|---|---|---|---|
| 1 | 102 | 660 | 4 | 94 | 62 | 32 | 1.149 |
| 2 | 204 | 660 | 16 | 176 | 90 | 86 | 1.138 |
| 3 | 102 | 760 | 4 | 169 | 116 | 53 | 1.132 |
| 4 | 204 | 760 | 4 | 150 | 112 | 38 | 1.134 |
| 5 | 204 | 760 | 8 | 170 | 115 | 55 | 1.132 |
| 6 | 204 | 760 | 16 | 197 | 95 | 102 | 1.136 |
| 7 | 306 | 760 | 16 | 185 | 122 | 63 | 1.130 |
| 8** | 204 | 860 | 4 | 197 | 146 | 51 | 1.124 |
| 9 | 306 | 860 | 8 | 329 | 136 | 193 | 1.127 |

Note:
*See footnotes 1 and 2 of Table I.
**This sample received an additional leaching in 30% NaOH at 100° C. for 4 hours.

Table IV

Electrodes Having Different Metal Cores

| | Core Substrate | Major Constituents of Core Substrate in % — Ni | Fe | Cr | Other | Interdiffusion Conditions °C. | Interdiffusion Conditions hours | Cathode Potential* Volts |
|---|---|---|---|---|---|---|---|---|
| Example IV Sample | | | | | | | | |
| 1 | Nickel 200 | 99 | — | — | — | 760 | 4 | 1.134 |
| 2 | Inconel 600 | 72 | 10 | 15 | — | 660 | 16 | 1.126 |
| 3 | Hastelloy C | 55 | 5 | 16 | 16 Mo | 710 | 16 | 1.123 |
| 4 | Incoloy 903 | 42 | 48 | 5 | — | 660 | 16 | 1.128 |
| 5 | Incoloy 800 | 32 | 45 | 20 | — | 660 | 16 | 1.132 |
| 6 | 310 Stainless | 20 | 50 | 25 | — | 660 | 8 | 1.132 |
| Comparison | | | | | | | | |
| a | 316 Stainless | 12 | 68 | 17 | — | 660 | 16 | 1.155 |
| b | 316 Stainless | 12 | 68 | 17 | — | 720 | 8 | 1.150 |
| c | 304 Stainless | 10 | 68 | 19 | — | 660 | 16 | 1.197 |
| d | Mild Steel | — | 100 | — | — | 760 | 4 | 1.217 |
| e | cobalt | — | — | — | 100 Co | 660 | 16 | 1.204 |
| f | copper | — | — | — | 100 Cu | 660 | 16 | 1.204 |

*Note: See footnote 2 of Table I.

The embodiments of the invention in which an exclusive property or privilege is claimed are defined as follows:

1. In a process for electrolyzing brine into chlorine, hydrogen and caustic in an electrolytic cell using a hydrogen-evolution cathode with an active porous nickel surface, the improvement comprising employing as the cathode an electrode having a porous Raney nickel layer of between 100 and 400 microns, an average porosity of at least 11%, and an average agglomerate size of at least 35 microns, thereby lowering hydrogen overvoltage.

2. In a process for preparing an electrode having a continuous surface layer of active porous nickel in electrical contact with a conductive metal core by interdiffusing a nickel-aluminum alloy layer on the core and then selectively leaching aluminum from the interdiffused layer, the improvement comprising:

providing the core with a nickel-bearing surface layer having a thickness of at least 100 microns and containing at least 15 percent by weight of nickel;

interdiffusing aluminum and at least a portion of the nickel in the surface layer of the core at a temperature of at least 660° C. for a time sufficient to provide the interdiffused nickel-aluminum alloy layer with a thickness of at least 85 microns; and selectively leaching, with an aqueous base, sufficient aluminum from the interdiffused alloy layer to provide an electrode having a continuous surface layer of active porous Raney nickel in electrical contact with, and metallurgically bonded to, the conductive metal core, said Raney nickel layer having a thickness of between 100 and 400 microns, an average porosity of at least 11%, and an averge agglomerate size of at least 35 microns.

3. The process of claim 2, comprising providing the nickel-bearing surface layer of the core with at least 18 percent by weight of nickel.

4. The process of claim 3, comprising providing the nickel-bearing surface layer with substantially pure nickel.

5. The process of claim 4, comprising providing the core of mild steel with a coating of nickel.

6. The process of claim 5, comprising coating the nickel-coated core with a layer of aluminum of at least 100 microns in thickness.

7. The process of claim 4, comprising forming an interdiffused layer containing $Ni_2Al_3$ grains having an average size between 3 and 75 microns.

8. The process of claim 7, comprising adjusting the temperature and time of interdiffusion to provide the interdiffused layer with a thickness between 100 and 400 microns in which the $Ni_2Al_3$ grains have an average size between 5 to 60 microns, and controlling leaching, temperature, time and base concentration to provide a porous Raney nickel layer with a thickness between 100 to 400 microns and an average porosity between 15 and 25%.

9. The process of claim 2, comprising employing a temperature of interdiffusion no greater than 1000° C.

10. The process of claim 9, comprising employing a temperature between 750° C. and 875° C.

11. The process of claim 2, comprising selectively leaching at least 60% of the aluminum from the interdiffused nickel-aluminum alloy layer.

12. The process of claim 11, comprising selectively leaching 75 to 95% of the aluminum from the interdiffused layer.

13. The process of claim 2, comprising treating the electrode to prevent pyrophoricity of the porous nickel layer in air, by immersing the electrode for one to four hours in a dilute aqueous inorganic solution of an inorganic salt selected from the group consisting of $NaNO_3$, $K_2Cr_2O_7$ and mixtures of $NaClO_3$ and $NaOH$.

14. The process of claim 2, comprising the additional step of covering the Raney nickel surface with a coating of nickel of 5 to 10 microns in thickness.

* * * * *